(No Model.) 5 Sheets—Sheet 1.
W. H. JOHNSON.
COMBINED PUNCHING AND SWAGING MACHINE.
No. 464,024. Patented Dec. 1, 1891.

Witnesses.
C. N. Keeney,
Anna V. Faust.

Inventor.
William H. Johnson

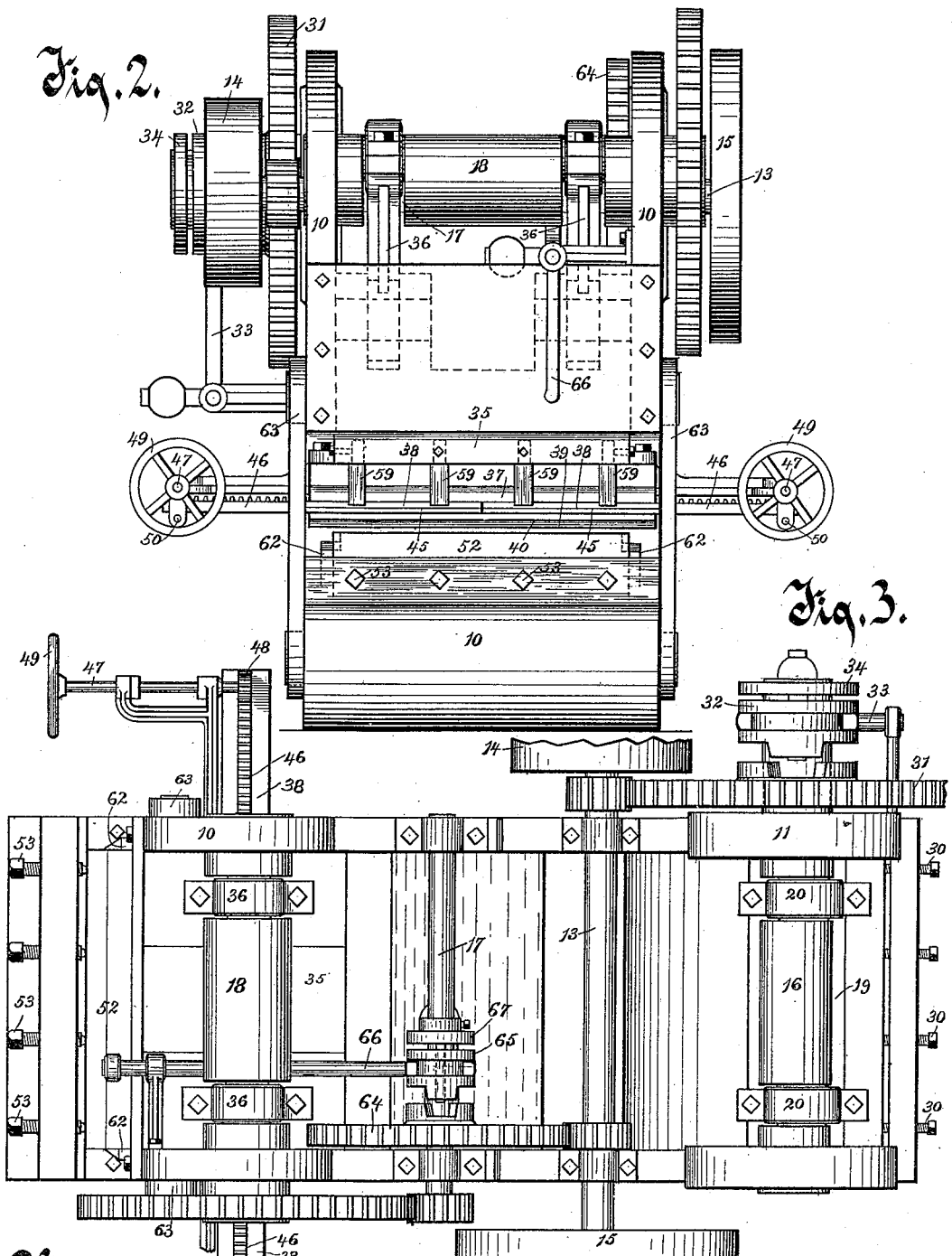

(No Model.) 5 Sheets—Sheet 3.
W. H. JOHNSON.
COMBINED PUNCHING AND SWAGING MACHINE.
No. 464,024. Patented Dec. 1, 1891.
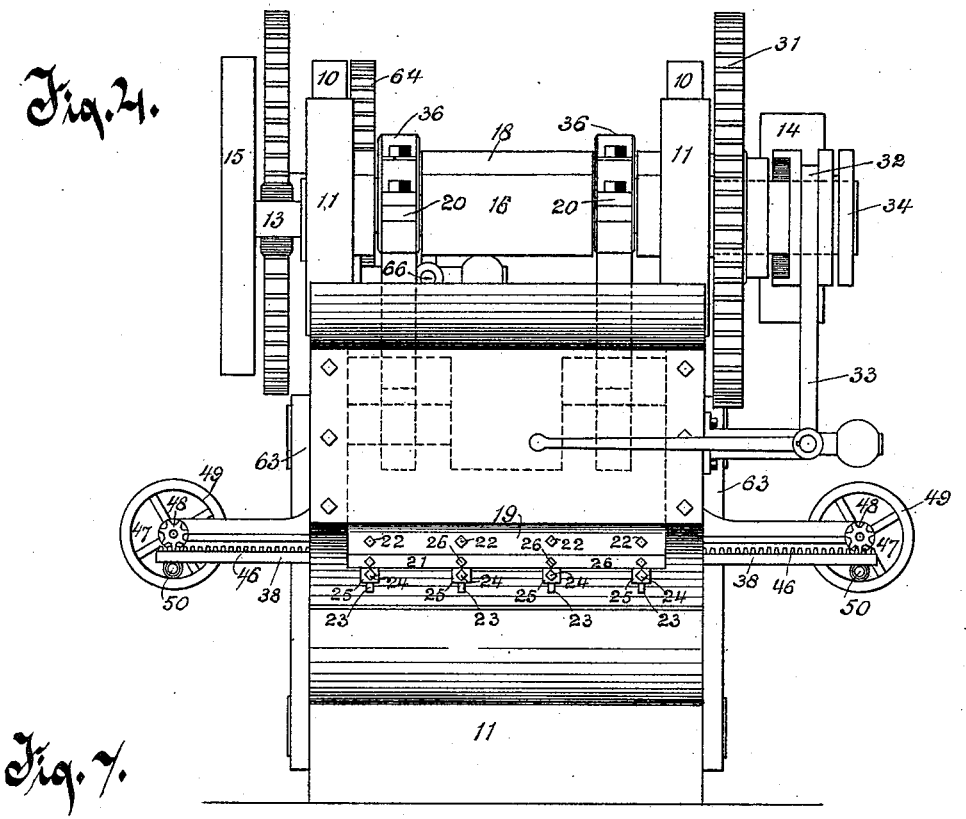
Fig. 4.
Fig. 7.
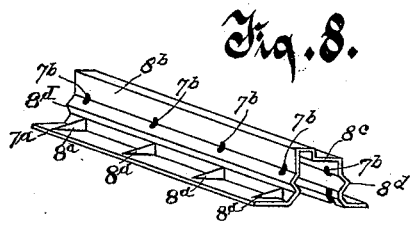
Fig. 8.
Witnesses.
O. N. Keeney
Anna V. Faust
Inventor.
William H. Johnson (No Model.)  5 Sheets—Sheet 4.

W. H. JOHNSON.
COMBINED PUNCHING AND SWAGING MACHINE.

No. 464,024.  Patented Dec. 1, 1891.

Witnesses.  Inventor.

William H Johnson

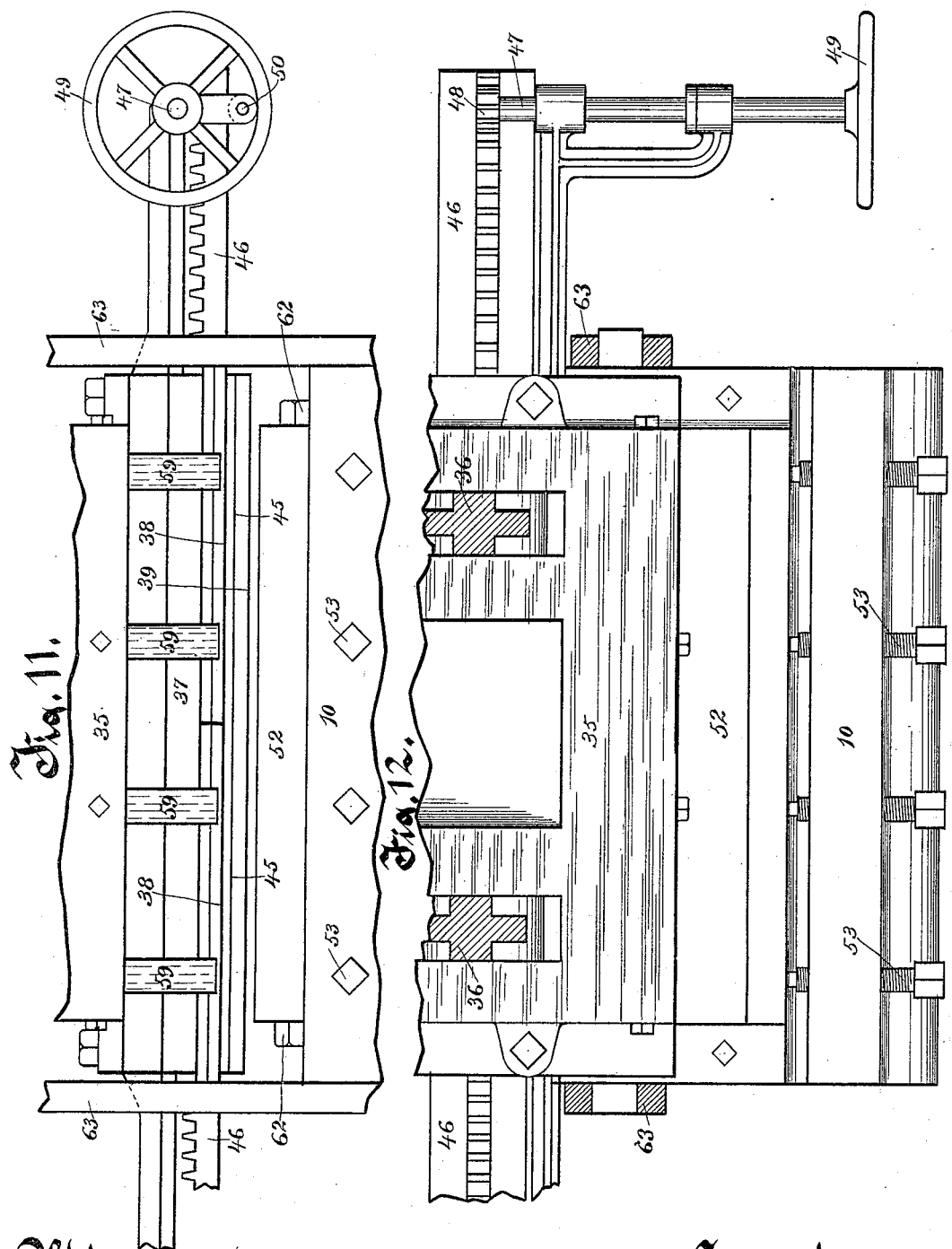

UNITED STATES PATENT OFFICE.

WILLIAM H. JOHNSON, OF MILWAUKEE, WISCONSIN, ASSIGNOR TO THE LEWIS & FOWLER GIRDER RAIL COMPANY, OF BROOKLYN, NEW YORK.

COMBINED PUNCHING AND SWAGING MACHINE.

SPECIFICATION forming part of Letters Patent No. 464,024, dated December 1, 1891.

Application filed November 17, 1890. Serial No. 371,721. (No model.)

*To all whom it may concern:*

Be it known that I, WILLIAM H. JOHNSON, a citizen of the United States, and a resident of Milwaukee, in the county of Milwaukee and State of Wisconsin, have invented a new and useful Combined Punching and Swaging Machine, of which the following is a description, reference being had to the accompanying drawings, which are a part of this specification.

My invention relates to machines especially adapted for punching and swaging railway-chair irons; and it consists in certain novel combinations of parts hereinafter particularly pointed out and claimed.

The primary object of this invention is to arrange for economically making by machinery certain wrought-iron chairs having braced sides, provided with lateral projections beveled at bottom and with side holes to receive horizontal clamping-bolts, invented and designed by William Clark Wood, of Brooklyn, in the State of New York.

The objects of the respective combinations of parts will be apparent to those skilled in the art from their description, as hereinafter set forth.

Figure 1:
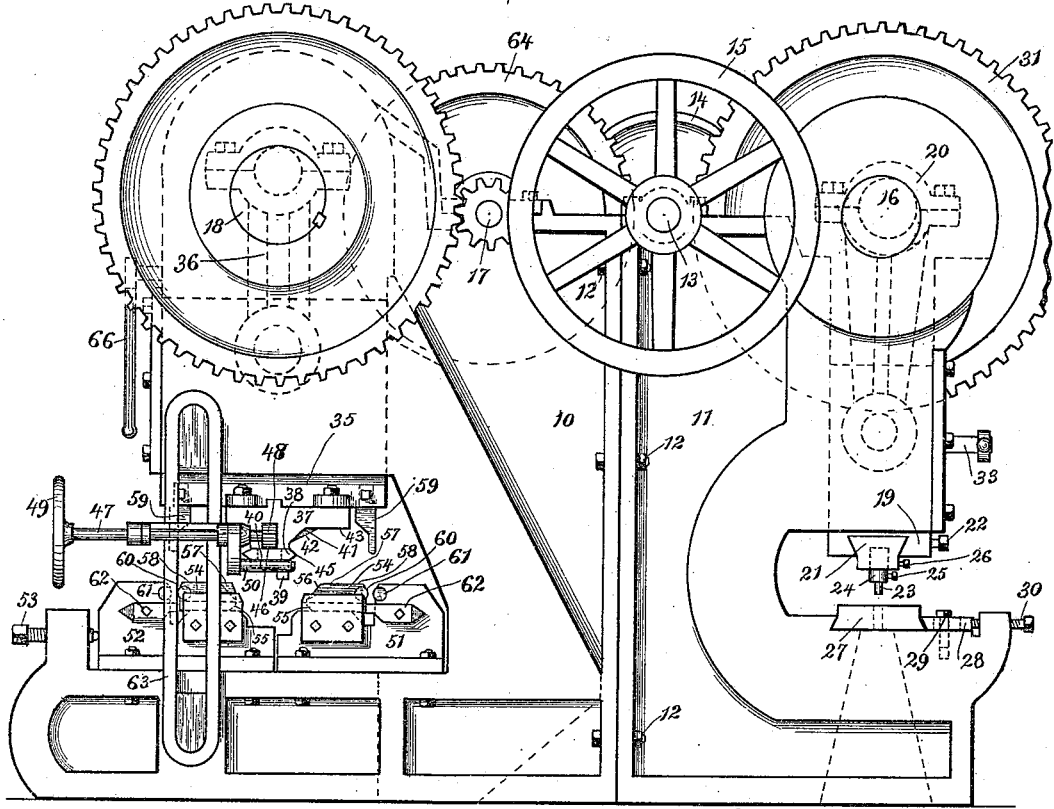
Figure 5:
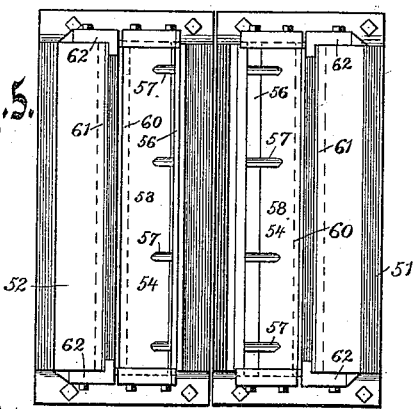
Figure 6:
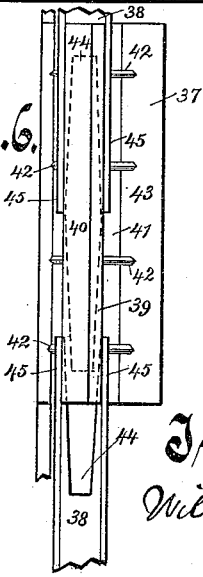
Figure 9:
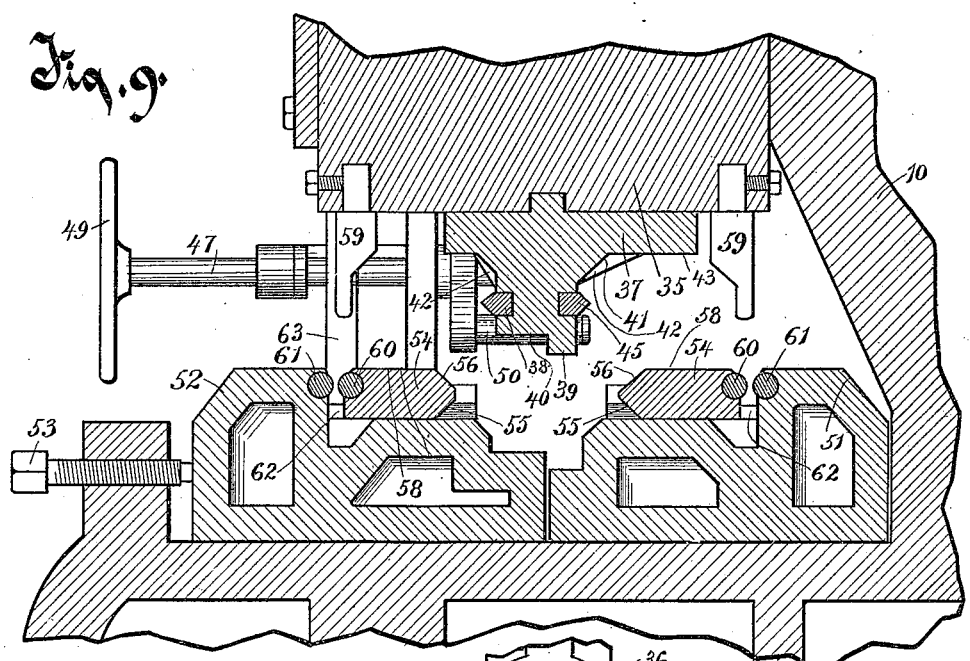
Figure 10:
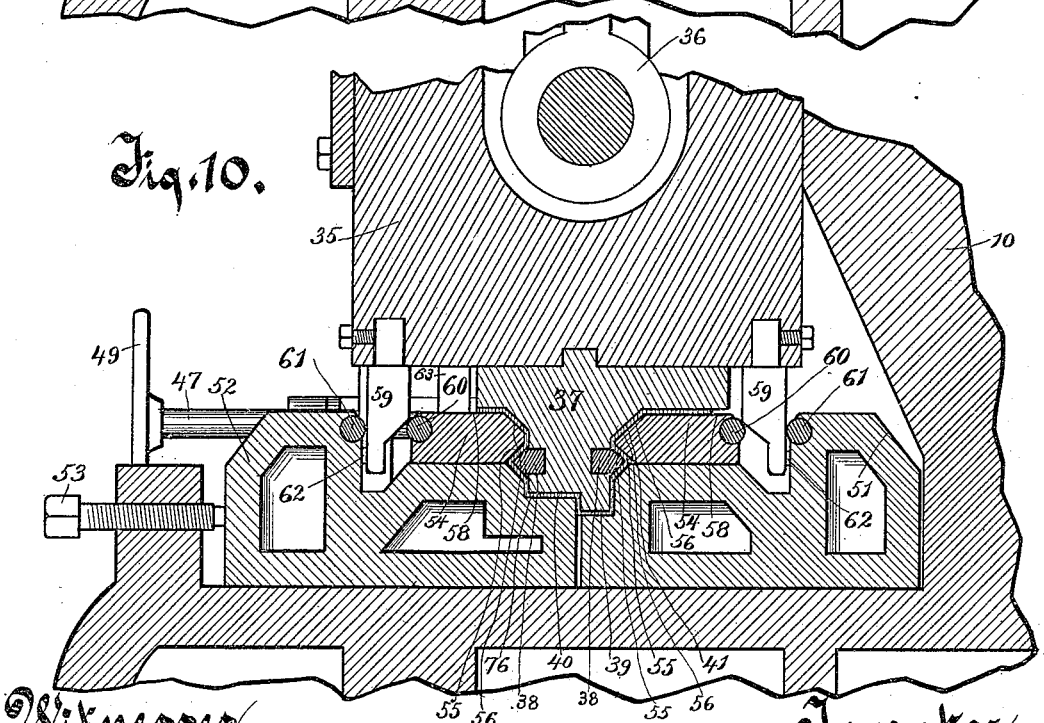

Figure 1 is a side elevation of my combined punching and swaging machine. Fig. 2 is an end view of the machine, showing the swaging mechanism at the left in Fig. 1. Fig. 3 is a top plan view of the machine. Fig. 4 is an end view of the machine, showing the punching mechanism at the right in Fig. 1. Fig. 5 is a top plan view of the lower or intaglio die of the swaging mechanism. Fig. 6 is a fragmentary view from the under side of the upper or cameo die. Fig. 7 represents the flat plate or blank of plate-iron after being punched by my machine and before being swaged. Fig. 8 represents the finished product of the machine. Figs. 9 and 10 represent a large-scale vertical section through the swaging-dies, with the dies open and closed in the respective figures. Fig. 11 is a fragmentary end view, enlarged, from Fig. 2; and Fig. 12 is a fragmentary plan of the parts shown in Fig. 11.

Like numerals indicate corresponding parts in the several figures.

The frame of my combined punching and swaging machine is conveniently formed in two parts 10 and 11, bolted together at 12. A driving-shaft 13, Fig. 1, is journaled in the frame and is provided with a driving-pulley 14 and a fly-wheel 15. At one side a shaft 16 is geared to the driving-shaft 13, which shaft 16 drives the punching mechanism. At the other side a shaft 17 is geared to the shaft 13 and is in turn geared to a shaft 18, which drives the stamping or swaging mechanism. Both the punching and swaging shafts 16 and 18 are geared down from the shaft 13, so as to have a much slower motion, the shaft 18 being geared to move much more slowly even than the shaft 16. A vertically-moving head-block 19, traveling in ways therefor in the frame, is supported and carried by pitmen 20, which ride at their upper ends on eccentrics formed in the shaft 16, whereby the head-block is given its vertical motion. A punch-block 21 is inserted laterally in the lower end or face of the head-block 19, and is secured therein by set-screws 22. Punches 23 are set in stocks 24, which are set in the punch-block 21, and said punches and stocks are secured by set-screws 25 and 26, respectively. The die or die-plate 27 is secured removably to the frame opposite the punches by means of a retaining-bar 28, secured to the frame by means of set-screws 29, passing through laterally-extending slots therefor in the bar and turning into the frame. The bar 28 is made adjustable toward and from the die-plate 27 by means of set-screws 30, turning in the frame against the bar. The spur-wheel 31 is loose on the shaft 16, and is arranged to be held thereto by the clutch 32, Fig. 3, splined on the shaft and adapted to be thrown into engagement with the spur-wheel 31 by means of a tilting-lever handle 33, pivoted on the frame, one arm of which is bifurcated and rides in a groove therefor in the clutch 32. A collar 34, rigid on the shaft 16, limits the movement of the clutch 32 outwardly.

The punching mechanism just described is adapted for punching the chair-iron plate in the manner shown in Fig. 7, to provide it with base holes $7^a$, fitted to spikes, bolts, or rivets for attaching the chair to cross-ties or the like, and with side holes $7^b$ to receive clamping-bolts extending through the chair from side to side, and this is done before the plate is swaged into the irregular form it has when completed. Such irregular form is represented by Fig. 8, which shows the main part or chair-iron of a chair for "box" girder-rails of the greatest length which the particular machine represented by Figs. 1 to 6 is designed to produce. It can be made of any less length from a blank or flat plate, Fig. 7, of the proper dimensions between the same dies, with one or more lateral braces 8ª on each side of the product, the base holes 7ª and side holes 7ᵇ being punched in each case to suit the demands of the particular length of chair. The product, Fig. 8, may also be made of different heights, with or without the top projection 8ᵇ, and with its top 8ᶜ at a greater or less distance above the beveled lateral projection 8ᵈ by mere modifications of the dies within the province of any skilled die-maker. Such chair-irons are provided internally with suitable struts and employed in connection with attaching-spikes and with rail-clamps and clamping-bolts, as set forth in the specification of the said William Clark Wood, forming part of his application for patent filed December 18, 1890, Serial No. 375,142.

In the swaging mechanism illustrated by Figs. 1 to 3, 5 and 6, and 9 to 12, as aforesaid, a head-block 35 is movable vertically in ways therefor in the frame, and is pivoted to pitmen 36, which ride at their upper ends on eccentrics formed in the shaft 18, whereby the head-block is given a vertical motion as this shaft revolves. The cameo-die is formed by a die-block 37, Figs. 9 and 10, secured rigidly to the face of the head-block 35, and laterally-movable die-bars 38, supported and arranged to be shifted laterally on the block 37. The face of the cameo-die is formed to give the irregular contour to the plate that is required in the finished article, and therefore has in the example the extreme downwardly-extending rib or projection 39, to form the interior of said top projection 8ᵇ, the face or step 40 matching said top 8ᶜ of the product, the flaring sides 41, the ribs 42, extending partly across the flaring sides, matching said braces 8ª of the product, and the flat downwardly-exposed surfaces 43, into which the other ends of said ribs 42 merge. Beside these several parts, the cameo-die also includes the said die-bars 38, which match said lateral projections 8ᵈ of the product. There are two of these bars meeting each other centrally of the cameo-die and supported and arranged to move laterally thereon. For this purpose these die-bars 38 are formed with recesses or sockets 44, Fig. 6, in their inner ends, adapted to receive therein a vertical neck of the cameo-die, alongside which the die-bars slide laterally. These sockets 44 are made tapering slightly outwardly toward the ends of the bars, and fit, when moved to their seats, the correspondingly-beveled neck of the die-block, and when moved laterally from their seats are so released from the neck of the die-block as to permit a slight springing inwardly of the bifurcated ends of the bars, so as to relieve them from pressing firmly outwardly against the swaged plate, and thus to render them readily removable therefrom. The transverse lateral edges of the die-bars 38 project centrally at 45 beyond the vertical sides of the die-block 37, immediately above as well as below these die-bars. The die-bars 38, Figs. 11 and 12, are further provided with racks 46, and shafts 47, journaled in brackets fixed on the frame, are provided with pinions 48, meshing with the racks 46, and with hand-wheels 49, whereby the die-bars are movable laterally. When the die-bars 38 are run out laterally from the die-block 37, their outer ends are received and supported on pins 50, fixed in downwardly-projecting parts of the brackets that support the shafts 47. The pins 50 are preferably provided with loose sleeves or anti-friction rollers.

The lower or intaglio die (shown detached in Fig. 5 and in vertical section in Figs. 9 and 10) is formed of a block in two parts 51 52, both of which are secured to the frame, the outer part 52 being also held up to its work relative to the part 51 by set-screws 53. The contour of the inner ends of the parts 51 and 52 forms so much of the intaglio-die as is below the plane of the greatest lateral extension of the die-bars 38. The remaining portion of the intaglio-die is formed by the opposing faces of die-bars 54, movable toward and from each other on the parts 51 and 52, respectively. The inner surfaces of the bars 54 have each an inwardly and upwardly beveled face 55, Figs. 1, 9, and 10, corresponding to and adapted to oppose the upper half of the beveled edges of the die-bars 38, a beveled face 56, corresponding to and arranged to oppose the flaring sides 41 of the die-block 37, grooves or recesses 57, Fig. 5, corresponding to and adapted to receive the ribs 42, and flat upper surfaces 58, corresponding to and adapted to oppose the flat surfaces 43 of the die-block 37. The die-bars 54 travel toward and from each other in ways therefor on the parts 51 and 52, and are arranged to be moved toward each other concurrently just after the plane of greatest lateral width of the die-bars 38 in their motion downwardly has passed the line of greatest horizontal projection inwardly toward each other of the bars 54. The bars 54 are thus moved inwardly toward each other by wedges or inclines 59, secured rigidly to the head-block 35, coming in contact with and bearing against the rear edges of the bars 54, and forcing them inwardly sufficiently to shape the interposed plate about the faces of the cameo-die. (See Fig. 10.) As the die-block 37 is moved upwardly the swaged plate is lifted therewith and the bevels of its projections 8ᵇ, matching the upper outwardly-downwardly flaring edges of the die-bars 38, bear against the upwardly-inwardly flaring surfaces 55 of the bars 54, and force these bars 54 outwardly as the die-block 37 is further raised. Anti-friction pins or rollers 60 and 61 are inserted loose in sockets therefor in the rear edges of the die-bars 54 and in the opposing faces of the parts 51 and 52, respectively, between which rollers the inclines 59 are forced and against which they bear. Buffers 62, secured to the parts 51 and 52, respectively, are arranged to check the outward movements of the bars 54.

Staying-links 63, Figs. 1 to 4 and 9 to 12, are passed over projections on different parts of the frame, and are adapted to strengthen it and to hold the separated parts of the frame in proper positions relatively to each other.

The spur-wheel 64, Figs. 1 to 4, is loose on the shaft 17, and a clutch 65, Fig. 3, splined on the shaft 17, is adapted by means of the tilting-lever handle 66 to be thrown into engagement with the wheel 64 and secures it rigidly to the shaft 17. The lever-handle 66 is pivoted on the frame, and its inner bifurcated arm rides in a groove therefor in the clutch 65. A collar 67, secured permanently to the shaft 17, limits the rearward movement of the clutch 65 away from the wheel 64.

What I claim as new, and desire to secure by Letters Patent, is—

1. The combination, in a machine for making railway-chairs, of a punching mechanism comprising reciprocating punches adapted to provide the flat plate with base and side holes, a swaging mechanism comprising a reciprocating die and movable die-bars adapted to convert the punched plate into a chair-iron having lateral projections formed by said die-bars, a driving shaft and gearing common to both mechanisms, speed-reducing trains, clutches, and motion-converting devices for the respective mechanisms, and means for moving said die-bars, substantially as described.

2. In a combined punching and swaging machine for making railway-chairs, the combination, with a punching mechanism adapted to provide the flat plate with base and side holes, of a swaging mechanism for converting the punched plate into a chair-iron, comprising cameo and intaglio dies provided, respectively, with the face 40, flaring sides 41, ribs 42, and flat downwardly-exposed surfaces 43, and with the beveled face 56, grooves 57, and flat upper surfaces 58, substantially as shown and described.

3. In a combined punching and swaging machine for making railway-chairs, the combination, with a punching mechanism adapted to provide a flat plate with base and side holes, of a swaging mechanism for converting the punched plate into a chair-iron, comprising cameo and intaglio dies provided, respectively, with the die-bars 38, face 40, flaring sides 41, ribs 42, and flat surfaces 43, and with the die-bars 54, beveled faces 56, grooves 57, and flat surfaces 58, substantially as shown and described.

4. In a combined punching and swaging machine for making railway-chairs, the combination, with a punching mechanism adapted to provide a flat plate with base and side holes, of a swaging mechanism for converting the punched plate into a chair-iron, comprising cameo and intaglio dies provided, respectively, with the die-bars 38, projection 39, face 40, flaring sides 41, ribs 42, and flat surfaces 43, and with the die parts 51 52, die-bars 54, beveled faces 56, grooves 57, and flat surfaces 58, substantially as shown and described.

5. In the swaging mechanism, the combination, with a suitable cameo-die, of an intaglio-die comprising a die-block in which a portion of the die is formed, movable bars, the faces of which form other portions of the die, arranged to be forced toward each other upon and over a part of the opposing cameo-die, and suitable means for operating the movable bars, substantially as described.

6. In the swaging mechanism, the combination, with a suitable cameo-die, of an intaglio-die comprising a die-block in which a portion of the intaglio-die is formed, movable bars having inner opposing edges, each edge having a beveled face adjoining its lower surface, which bars are arranged to be forced inwardly toward each other above fixed parts of the die, and means for forcing the movable bars toward and from each other, substantially as described.

7. In the swaging mechanism, the combination, with a suitable cameo-die, of an intaglio-die comprising a die-block formed in two parts, in the adjoining edges of which a portion of the intaglio-die is formed, movable bars having inner opposing edges fitted and adapted to travel toward and from each other on the relatively-fixed die-block, and means, substantially as described, for forcing the movable bars forward partly over that portion of the die formed in the fixed block.

8. In the swaging mechanism, the combination, with a die-block in which a part of the intaglio-die is formed, of movable bars supported and traveling in ways toward and from each other on the relatively-fixed block, anti-friction rollers loose in bearings therefor in the rear edges of the movable bars, other rollers loose in bearings therefor in faces of the die-block opposite the rollers in the movable bars, and wedges fixed on a vertically-moving part of the mechanism and adapted to be thrust between the rollers in the die-block and in the bars and to force the bars forward, substantially as described.

9. In the swaging mechanism, the combination, with a suitable intaglio-die, of a cameo-die fixed on vertically-moving head, which cameo-die has a part projecting transversely beyond other superposed parts of the dies, substantially as described.

10. In the swaging mechanism, the combination, with a suitable intaglio-die, of a cameo-die comprising a die-block fixed on a vertically-moving head, laterally-movable bars normally abutting centrally and supported on the fixed die-block, the lateral edges of which bars project transversely beyond superposed parts of the die, substantially as described.

11. In the swaging mechanism, the combination, with a suitable intaglio-die, of a cameo-die comprising a relatively-fixed die-block, laterally-movable bars, the edges of which project transversely beyond superposed parts of the die, a neck formed in the fixed part of the die, which neck is beveled slightly horizontally, and correspondingly-beveled sockets in the inner ends of the movable bars, whereby they are made to fit snugly to the neck when at their seats and to be loose thereon when moved from their seats, substantially as described.

12. In the swaging mechanism, the combination, with a suitable intaglio-die, of a cameo-die comprising a die-block, the face of which forms a portion of the die, two bars supported movably on a part of the die, the edges of which bars project transversely beyond superposed parts of the die, racks on the bars, and shafts with pinions gearing in the racks adapted to shift the bars endwise, substantially as described.

13. In the swaging mechanism, the combination, with a suitable intaglio-die, of a cameo-die comprising a die-block, the face of which forms a portion of the die, bars supported movably on a part of the die, the edges of which form a portion of the die and project transversely beyond superposed parts of the die, racks on the bars, shafts with pinions gearing in the racks, adapted to shift the bars endwise, and pins supported on the frame and arranged to serve as bearings for the support of the outer ends of the movable bars, substantially as described.

14. The combination, in the swaging mechanism, of an intaglio-die formed partly in a die-block and partly in and by relatively-movable bars supported thereon and arranged to be forced inwardly toward each other above and beyond other parts of the die, and a cameo-die formed partly by a die-block fixed on a vertically-moving head and partly in and by laterally-movable bars supported on the relatively-fixed die-block, means, substantially as described, for forcing the movable bars forming part of the intaglio-die over the movable bars of the cameo-die, and suitable means for moving the bars forming part of the cameo-die, substantially as described.

In testimony whereof I affix my signature in presence of two witnesses.

WILLIAM H. JOHNSON.

Witnesses:
C. T. BENEDICT,
ANNA V. FAUST.